United States Patent [19]
Bush et al.

[11] Patent Number: 5,828,583
[45] Date of Patent: Oct. 27, 1998

[54] DRIVE FAILURE PREDICTION TECHNIQUES FOR DISK DRIVES

[75] Inventors: Kenneth L. Bush, Cypress, Tex.;
Jonathan R. Didner, Hillsboro, Oreg.;
Thomas R. Lenny, Houston, Tex.

[73] Assignee: Compaq Computer Corporation, Houston, Tex.

[21] Appl. No.: 635,429

[22] Filed: Apr. 18, 1996

Related U.S. Application Data

[63] Continuation of Ser. No. 404,812, Mar. 13, 1995, abandoned, which is a continuation-in-part of Ser. No. 110,652, Aug. 20, 1993, Pat. No. 5,559,958, which is a continuation-in-part of Ser. No. 933,920, Aug. 21, 1992, Pat. No. 5,471,617.

[51] Int. Cl.$^6$ .................................................. G01B 17/00
[52] U.S. Cl. ........................... 364/551.01; 395/184.01; 395/183.18
[58] Field of Search ............................ 360/75, 103, 104, 360/137; 364/551.01; 395/575, 183.01, 183.02, 183.18, 184.01; 371/3, 5.1–5.5, 21.2, 21.4, 21.6, 25.1, 26

[56] References Cited

U.S. PATENT DOCUMENTS

| | | | |
|---|---|---|---|
| 3,704,363 | 11/1972 | Salmassy et al. | 235/153 |
| 4,268,905 | 5/1981 | Johann et al. | 364/200 |
| 4,348,761 | 9/1982 | Berger | 371/21 |
| 4,725,968 | 2/1988 | Baldwin et al. | 364/550 |
| 4,841,389 | 6/1989 | Hoyt et al. | 360/75 |
| 5,067,128 | 11/1991 | Nakane | 371/5.5 |
| 5,371,882 | 12/1994 | Ludlam | 395/575 |
| 5,410,439 | 4/1995 | Egbert et al. | 360/75 |
| 5,422,890 | 6/1995 | Klingsporn et al. | 371/5.1 |
| 5,469,463 | 11/1995 | Polich et al. | 395/182.18 |
| 5,500,940 | 3/1996 | Skeie | 395/183.01 |
| 5,539,592 | 7/1996 | Banks et al. | 360/75 |
| 5,557,183 | 9/1996 | Bates et al. | 318/434 |

OTHER PUBLICATIONS

"Predictive Failure Analysis", IBM Corporation, believed to be made public Nov. 1994.

Blachek, Michael D. and Iverson, David E.; "Predictive Failure Analysis–Advanced Condition Monitoring", IBM Corporation, believed to be made public Nov. 1994.

Colegrove, Dan; "Informational Exception Condition Reporting" ATA–3 Proposal (X3T10/95–111r1), IBM Corporation, Mar. 1, 1995.

*Primary Examiner*—James P. Trammell

[57] ABSTRACT

Method for predicting an imminent failure of a disk drive. A plurality of attributes are selected for monitoring during operation of the disk drive. These attributes may include self-preserving attributes, performance attributes, error rate attributes, and even count attributes. An initial value is determined for each one of the selected attributes. A threshold value is then selected for each of the attributes. The disk drive is then monitored for occurrences of the self-preserving, performance, error rate and event count attributes. Each time an occurrence of the attributes is monitored, the initial value for that attribute is updated and normalized. The updated normalized value for the attribute is then compared with the corresponding threshold for that attribute and an imminent failure of the disk drive is predicted if the normalized updated value of the attribute exceeds the threshold therefor.

33 Claims, 6 Drawing Sheets

|  | DESCRIPTION | BYTES | FORMAT | TYPE |
|---|---|---|---|---|
| 44 | DATA STRUCTURE REV. NO. | 1 | BINARY | RD ONLY |
| 46-1 | 1ST DRIVE ATTRIBUTE | 2 | VARIES | RD/WRT |
|  | ⋮ | " | " | " |
|  | ⋮ | " | " | " |
| 46-30 | 30TH DRIVE ATTRIBUTE | 12 | VARIES | RD/WRT |
| 48 | RESERVED | 100 |  | RD/WRT |
| 50 | VENDOR UNIQUE | 49 |  | RD ONLY |
| 52 | DATA STRUCTURE CHECKSUM | 1 |  | RD ONLY |
|  | TOTAL BYTES | 512 |  |  |

*FIG. 3*

|  | DESCRIPTION | BYTES | FORMAT | TYPE |
|---|---|---|---|---|
| 54 | ATTRIBUTE ID NO. | 1 | BINARY | RD ONLY |
| 56 | STATUS FLAGS | 2 | BIT FLAGS | RD ONLY |
| 56-1 | PRE-FAILURE WARRANTY |  |  |  |
| 56-2 | ON-LINE COLLECTION |  |  |  |
| 56-3 | PERF. ATTRIBUTE TYPE |  |  |  |
| 56-4 | ERROR RATE ATTRIBUTE TYPE |  |  |  |
| 56-5 | EVENT COUNT ATTRIBUTE TYPE |  |  |  |
| 56-6 | SELF-PRESERVING ATTRIBUTE TYPE |  |  |  |
| 56-7 | RESERVED |  |  |  |
| 58 | NORMALIZED ATTRIBUTE VALUE | 1 | BINARY | RD ONLY |
| 60 | WORST EVER NORMALIZED ATTRIBUTE VALUE | 1 | BINARY | RD ONLY |
| 62 | RAW ATTRIBUTE VALUE | 6 | BINARY | RD ONLY |
| 64 | RESERVED | 1 |  | RD ONLY |
|  | TOTAL BYTES | 12 |  |  |

*FIG. 4*

DRIVE FAILURE PREDICTION TECHNIQUES FOR DISK DRIVES

CROSS REFERENCE TO RELATED APPLICATIONS

This is a continuation of application Ser. No. 08/404,812 filed on Mar. 13, 1995, now abandoned, which is a Continuation-in-Part of U.S. patent application Ser. No. 08/110,652, filed Aug. 20, 1993, U.S. Pat. No. 5,559,958 entitled "Graphical User Interface for Computer Management System and an Associated Management Information Base, which is a Continuation-in-Part of U.S. patent application Ser. No. 07/933,920, filed Aug. 21, 1992, U.S. Pat. No. 5,471,617 entitled "Computer Management System and Associated Management Information Base". Both of these applications are assigned to the Assignee of the present application and are hereby incorporated by reference as if reproduced in their entirety.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to failure prediction techniques for storage devices and, more particularly, relates to a method for predicting a potential failure of an ATA disk drive before the drive failure actually occurs.

2. Description of Related Art

The vast majority of personal computer (or "PC") systems available today come equipped with a peripheral storage device such as a hard disk drive. These storage devices, commonly referred to as ATA disk drives, have become an essential part of PC systems.

While quite reliable, ATA disk drives will occasionally fail. As a result, the associated PC system will be down while the ATA disk drive is replaced. Additionally, the drive failure may cause the loss of some or all of the data stored on the ATA disk drive. While much of the data stored on a failed drive is recoverable, the recovery of such data may prove both costly and time consuming. Thus, unless the ATA disk drive was backed up immediately prior to the drive failure, the cost of an unscheduled failure of a disk drive may be great.

There are two general classes of failures that can occur in ATA disk drives. The first class is the "on/off" type of failure which causes the drive to quickly and unpredictably fail. The drive failure prediction techniques disclosed herein are not expected to be able to predict "on/off" failures of ATA disk drives. The second class of failures result due to the gradual decay of electrical and/or mechanical components within the ATA disk drive. It is hoped that the drive failure prediction techniques disclosed herein will be able to predict 20% of these "gradual" failures of ATA disk drives.

As disclosed herein, drive failure prediction is a technique by which the operation of a disk drive is monitored, preferably, by monitoring key disk drive attributes, and analyzed such that the user may be notified of potential drive failures before they occur. By providing advance warning of a drive failure, the user may schedule the computer for drive replacement, thereby avoiding the unplanned interruptions and potential data loss caused by a drive failure.

In the parent and grandparent of the present application, a computer management system having plural instrumentation agents for querying manageable devices to collect object data, an associated enterprise management information base (or "MIB") for storing object data in accordance with a specified MIB architecture and a graphical user interface (or "GUI") for managing the manageable devices using the enterprise MIB. Included as part of the disclosed enterprise MIB was a physical drive child group which contained configuration and statistical information regarding the physical drives associated with the drive controller for each device to be managed. The information was arranged in the form of objects which included each individual spindle in the array.

Referring now to FIG. 1, the physical drive child group located at branch 232.3.2.5 of the enterprise MIB disclosed in the parent and grandparent of the present application will now be described in greater detail. The physical drive child group contains configuration and statistical information regarding the physical drives associated with the drive array controller in the form of objects that describe each individual spindle in the array. Examples of information which would be contained in the physical drive child group include drive model, firmware revision, bay offset, reallocation units available, reallocation units used, on-line performance test results.

More specifically, the physical drive child group contains a physical drive table located at branch 232.3.2.5.1. The physical drive table includes an entry N for each physical drive associated with the drive array and, for each entry N, the physical drive table includes a controller index object located at branch 232.3.2.5.1.N.1, a drive index object located at branch 232.3.2.5.1.N.2, a model object located at branch 232.3.2.5.1.N.3, a firmware revision object located at branch 232.3.2.5.1.N.4, a bay location object located at branch 232.3.2.5.1.N.5, a status object located at branch 232.3.2.5.1.N.6, a factory reallocation object located at branch 232.3.2.5.1.N.7, a used reallocations object located at branch 232.3.2.5.1.N.8, a reference minutes object located at branch 232.3.2.5.1.N.9, a read sectors object located at branch 232.3.2.5.1.N.10, a write sectors object located at branch 232.3.2.5.1.N.11, a seeks object located at branch 232.3.2.5.1.N.12, a hard read errors object located at branch 232.3.2.5.1.N.13, a recovered read errors object located at branch 232.3.2.5.1.N.14, a hard write errors object located at branch 232.3.2.5.1.N.15, a recovered write errors object located at branch 232.3.2.5.1.N.16, a seek errors object located at branch 232.3.2.5.1.N.17, a spinup time object located at branch 232.3.2.5.1.N.18, first, second and third functional test objects located at branches 232.3.2.5.1.N.19, 232.3.2.5.1.N.20 and 232.3.2.5.1.N.21, respectively, a DRQ timeouts object located at branch 232.3.2.5.1.N.22, an other timeouts object located at branch 232.3.2.5.1.N.23, a spinup retries object located at branch 232.3.2.5.1.N.24, a recover failed read errors object located at branch 232.3.2.5.1.N.25, a recover failed write errors object located at branch 232.3.2.5.1.N.26, a format errors object located at branch 232.3.2.5.1.N.27, a power on self test error object located at branch 232.3.2.5.1.N.28, a drive not ready errors object located at branch 232.3.2.5.1.N.29, a reallocation abort object located at branch 232.3.2.5.1.N.30, a factory threshold exceeded object located at branch 232.3.2.5.1.N.31, a monitor information object located at branch 232.3.2.5.1.N.32 and a drive condition object located at branch 232.3.2.5.1.N.33. The formal organization of the physical drive table is as follows:

-5-      Patent Application
         Docket # CMPQ-0748
                   P-748

```
phyDrvTableOBJECT-TYPE
    SYNTAXSEQUENCE OF PhyDrvEntry
    ACCESSnot-accessible
    STATUSmandatory
    DESCRIPTION
        "Drive Array Physical Drive Table A table of physical drive entry"
    ::- ( phyDrv 1 )

PhyDrvEntry::= SEQUENCE
(
    phyDrvCntlrIndexINTEGER,
    phyDrvModelDisplayString,
    phyDrvFWRevDisplayString,
    phyDrvBayLocationINTEGER,
    phyDrvstatusINTEGER,
    phyDrvFactReallocINTEGER,
```

```
                phyDrvUsedReallocCounter,
                phyDrvRefMinutesCounter,
                phyDrvReadSectorsCounter,
                phyDrvWriteSectorsCounter,
                phyDrvSeeksCounter,
                phyDrvHardReadErrsCounter,
                phyDrvRecvReadErrsCounter,
                phyDrvSeekErrsCounter,
                phyDrvSpinupTimeINTEGER,
                phyDrvFunctionalTest1Gauge,
                phyDrvFunctionalTest2Gauge,
                phyDrvFunctionalTest3Gauge,
                phyDrvDrqTimeoutsCounter,
                phyDrvOtherTimeoutsCounter,
                phyDrvSpinupRetriesCounter,
                phyDrvFailedRecvReadsCounter,
                phyDrvFailedRecWritesCounter,
                phyDrvFormatErrorsCounter,
                phyDrvPostErrorINTEGER,
                phyDrvDrvNotReadyErrsCounter,
                phyDrvReallocAbortsCounter,
                phyDrvThresholdExceededINTEGER,
                phyDrvDrvHasMonitorInfoINTEGER,
                phyDrvConditionINTEGER phyDrvCntlrIndexOBJECT-TYPE
            SYNTAXINTEGER
            ACCESSread-only
            STATUSmandatory
            DESCRIPTION
                "Drive   Array   Physical   Drive   Controller
        Index This index maps the physical drive back to
                the controller to which it is attached.
                The value of this index is the same as the
                one used under the controller group."
            ::= ( phyDrvEntry 1 )

phyDrvIndexOBJECT-TYPE
            SYNTAXINTEGER
            ACCESSread-only
            STATUSmandatory
            DESCRIPTION
                "Drive Array Physical Drive Index This  index  is  used  for  selecting  the
                physical drive table entry.  The index is
                the physical drive number based on the
                logical drive's drive assignment map."
            ::= ( phyDrvEntry 2 )
```

-7- Patent Application
Docket # CMPQ-0748
P-748

```
phyDrvModelOBJECT-TYPE
    SYNTAXDisplayString
    ACCESSread-only
    STATUSmandatory
    DESCRIPTION
        "Physical Drive Model This is a test description of the physical
        drive.  The text that appears depends upon
        who manufactured the drive and the drive
        type.

For example, you might see: COMPAQ 210MB
        CP3201.

If a model number is not present, you may
        not have properly initialized the drive
        array to which the physical drive is
        attached for monitoring.  If you suspect
        that a problem exists, schedule server
        down time to run COMPAQ DIAGNOSTICS and
        select the Drive Monitoring Diagnostics
        option."
    ::= ( phyDrvEntry 3)

phyDrvModelOBJECT-TYPE
    SYNTAXDisplayString
    ACCESSread-only
    STATUSmandatory
    DESCRIPTION
        "Physical Drive Model This is a test description of the physical
        drive.  The text that appears depends upon
        who manufactured the drive and the drive
        type.

For example, you might see: COMPAQ 210MB
        CP3201.

If a model number is not present, you may
        not have properly initialized the drive
        array to which the physical drive is
        attached for monitoring.  If you suspect
        that a problem exists, schedule server
        down time to run COMPAQ DIAGNOSTICS and
        select the Drive Monitoring Diagnostics
        option."
    ::= ( phyDrvEntry 3 )

phyDrvFWRevOBJECT-TYPE
```

-8- Patent Application
Docket # CMPQ-0748
P-748

```
        SYNTAXDisplayString (SIZE (0..8))
        ACCESSread-only
        STATUSmandatory
        DESCRIPTION
            "Physical Drive Firmware Revision This shows the physical drive revision
            number.

If the firmware revision is not present,
            you have not properly initialized the
            drive array.  If you suspect that a
            problem exists, schedule server down time
            to run COMPAQ DIAGNOSTICS and select the
            Drive Monitoring Diagnostics option."
        ::= ( phyDrvEntry 4 )

phyDrvBayLocationOBJECT-TYPE
        SYNTAXINTEGER
        ACCESSread-only
        STATUSmandatory
        DESCRIPTION
            "Physical Drive Bay Location This value matches the bay location where
            the physical drive has been installed.
            Each bay is labeled with a separate number
            so that you can identify the location of
            the drive."
        ::= ( phyDrvEntry 5 )

phyDrvStatusOBJECT-TYPE
        SYNTAXINTEGER
        (
            other(1),
            ok(2),
            failed(3)
        )
        ACCESSread-only
        STATUSmandatory
        DESCRIPTION
            "Physical Drive Status This shows the status of the physical
            drive.

The following values are valid for the
            physical drive status:
```

-9- Patent Application
Docket # CMPQ-0748
P-748

```
        ok (2)
            Indicates  the  drive  is  functioning
            properly.
5
        Failed (3)
            Indicates that the drive is no longer
            operating and should be replaced.

10      Other (1)
            Indicates that the instrument agent does
            not recognize the drive.  You may need to
            upgrade your software.

15          If you suspect a problem, run COMPAQ
    DIAGNOSTICS."
        ::= ( phyDrvEntry 6 )

phyDrvFactReallocsOBJECT-TYPE
20      SYNTAXINTEGER
        ACCESSread-only
        STATUSmandatory
        DESCRIPTION
            "Physical Drive Used Reallocated Sectors
25
            This shows the number of sectors of the
            reallocation area that have been used by
            the physical drive.

30          To see how many sectors were originally
            available for use in the reallocation
            area, refer to the factory reallocation
            information if it exists.  Not all drives
            support factory reallocation.
35
            Because of the nature of magnetic disks,
            certain sectors on a drive may have media
            defects.  The reallocation area is part of
            the disk drive that the drive manufacturer
40          sets  aside  to  compensate  for  these
            defects.  The  drive  array  controller
            writes information addressed from these
            unusable sectors to available sectors in
            the  reallocation  area.   If  too  many
45          sectors have been reallocated, there may
            be a problem with the drive.

If you suspect a problem, schedule server
            down time to run COMPAQ DIAGNOSTICS and
50          select the Drive Monitoring Diagnostics
            option to verify that a problem exists."
```

-10- Patent Application
Docket # CMPQ-0748
P-748

```
        ::= ( phyDrvEntry 8 )

phyDrvRefMinutesOBJECT-TYPE
        SYNTAXCounter
        ACCESSread-only
        STATUSmandatory
        DESCRIPTION
            "Reference Minutes This shows the total number of minutes
            that a physical drive has been spinning
            since the drive was stamped.  The drive
            will have either been stamped when it left
            the factory or when you ran COMPAQ
            DIAGNOSTICS on your new drive.  You can
            use the reference time to calculate rates
            for other physical drive events."
        ::= ( phyDrvEntry 9 )

phyDrvReadSectorsOBJECT-TYPE
        SYNTAXCounter
        ACCESSread-only
        STATUSmandatory
        DESCRIPTION
            "Sectors Read This shows the total number of sectors
            read from the physical disk drive.

This information may be useful for
            determining rates.  For instance, if you
            wanted to calculate the average number of
            reads per minute of operation, divide this
            number by the reference minutes."
        ::= (phyDrvEntry 10 )

phyDrvWriteSectorsOBJECT-TYPE
        SYNTAXCounter
        ACCESSread-only
        STATUSmandatory
        DESCRIPTION
            "Sectors Written This shows the total number of sectors
            written to the physical disk drive.  This
            information may be useful for determining
            rates.  For instance, if you wanted to
            calculate the average number of writes per
            minute of operation, divide this number by
            the reference minutes."
        ::= ( phydrvEntry 11 )
```

-11- Patent Application
Docket # CMPQ-0748
P-748

```
phyDrvSeeksOBJECT-TYPE
    SYNTAXCounter
    ACCESSread-only
    STATUSmandatory
    DESCRIPTION
        "Total Seeks This shows the total number of seek
        operations performed by the physical drive
        since the drive was shipped."
    ::= ( phydrvEntry 12 )

phyDrvHardReadErrsOBJECT-TYPE
    SYNTAXCounter
    ACCESSread-only
    STATUSmandatory
    DESCRIPTION
        "Hard Read Errors This shows the number of read errors that
        have occurred on a drive that could not be
        recovered by a physical drive's Error
        Correction Code (ECC) algorithm or through
        retries.  Overtime, a disk drive may
        produce these errors.  If you receive
        these errors, a problem may exist with
        your drive.

The value increases every time the
        physical drive detects another error.

The severity of these errors depends on
        whether the monitored system is running in
        a fault tolerant mode.  With fault
        tolerance, the controller can remap data
        to eliminate the problems caused by these
        errors.  In either case, if you see an
        increase in these errors, schedule server
        down time to run COMPAQ DIAGNOSTICS to
        verify that a problem exists."
    ::= (phyDrvEntry 13 )

phyDrvRecvReadErrsOBJECT-TYPE
    SYNTAXCounter
    ACCESSread-only
    STATUSmandatory
    DESCRIPTION
        "Recovered Read Errors This shows the number of read errors
```

-12- Patent Application
Docket # CMPQ-0748
P-748 corrected through physical drive retries.

Over time, all disk drives produce these errors. If you notice a rapid increase in the value for Recovered Read Errors (or Hard Read Errors), a problem may exist with the drive. The value increases every time the physical drive detects and corrects another error.

Expect more Recovered Read Errors than Hard Read Errors. If you suspect that a problem may exist with the drive, schedule server down time to run COMPAQ DIAGNOSTICS."
::= ( phyDrvEntry 14 )

phyDrvHardWriteErrs OBJECT-TYPE
    SYNTAXCounter
    ACCESSread-only
    STATUSmandatory
    DESCRIPTION
        "Hard Write Errors This shows the number of write errors that could not be recovered by a physical drive.

Over time a disk drive may detect these errors. If you notice an increase in the value shown for Hard Write Errors or Recovered Write Errors, a problem may exist with the drive. The value increases every time the physical drive detects another error. On average, these errors should occur less frequently than read errors. If you see an increase in these errors, schedule server down time to run COMPAQ DIAGNOSTICS to verify that a problem exists."
::= ( phyDrvEntry 15 )

phyDrvRecWriteErrsOBJECT-TYPE
    SYNTAXCounter
    ACCESSread-only
    STATUSmandatory
    DESCRIPTION
        "Recovered Write Errors This shows the number of write errors corrected through physical drive retries -13- Patent Application
Docket # CMPQ-0748
P-748 or recovered by a physical drive on a monitored system.

Over time a disk drive may produce these errors.

If you notice an increase in the value shown for Hard Write Errors or Recovered Write Errors, a problem may exist with the drive.

The value increases every time the physical drive detects and corrects and error. Only an unusually rapid increase in these errors indicates a problem.

On average, these errors should occur less frequently than hard read errors. If you suspect that a problem may exist with the drive, schedule server down time to run COMPAQ DIAGNOSTICS."
::= ( phyDrvEntry 16 )

phyDrvSeekErrsOBJECT-TYPE
    SYNTAXCounter
    ACCESSread-only
    STATUSmandatory
    DESCRIPTION
        "Seek Errors This shows the number of seek errors that a physical drive detects. Over time, a disk drive usually produces these errors. If you notice a rapid increase in the value shown for Seek Errors, this physical drive may be failing.

The value increases every time the physical drive produces another error. Only an unusually rapid increase in these errors indicates a problem. If you suspect that a problem exists, schedule server down time to run COMPAQ DIAGNOSTICS."
    ::= (phyDrvEntry 17 )

phyDrvSpinupTimeOBJECT-TYPE
    SYNTAXINTEGER
    ACCESSread-only
    STATUSmandatory
    DESCRIPTION -14- Patent Application
Docket # CMPQ-0748
P-748

"Spinup Time in milliseconds

This is the time it takes for a physical drive to spin up to full speed.

Disks require time to gain momentum and reach operating speed. As cars are tested to go from 0 mph to 60 mph in x number of seconds, drive manufacturers have preset expectations for the time it takes the drive to spin to full speed. Drives that do not meet these expectations may have problems.

The value may be zero under one of the following conditions:

If you are monitoring a physical drive that is part of the monitored system's internal drive array storage, and you use a warm boot to reset the monitored system. During a warm boot, the drives continue to spin.

If you have a COMPAQ Drive Array but have a version of the physical controller ROM that is less than version 1.00. If you have used and upgrade utility on versions less than 1.00, the value may still be zero.

If you are monitoring a physical drive in an Intelligent Array Expansion System and you reset the monitored system but not the Intelligent Array Expansion System.

If you suspect a problem, schedule server down time to run COMPAQ DIAGNOSTICS and select the Drive Monitoring Diagnostics option to verify that a problem exists."
::= ( phyDrvEntry 18 )

phyDrvFunctionalTest1OBJECT-TYPE
    SYNTAXGauge
    ACCESSread-only
    STATUSmandatory
    DESCRIPTION
        "Functional Test 1

This provides information about a series of tests that indicate how well a physical -15- Patent Application
Docket # CMPQ-0748
P-748 drive works. These tests compare the way the physical drive currently operates when performing various tasks with the way it worked when it was new.

A percent value is displayed that represents how the drive works currently when compared to how the drive worked when new. New drives operate at 100% level. By default, if the current value is less than or equal to 80 percent, a problem may exist.

If you suspect a problem, schedule server down time to run COMPAQ DIAGNOSTICS and select the Drive Monitoring Diagnostics option to verify that a problem exists."
::= ( phyDrvEntry 19 )

phyDrvFunctionalTest2OBJECT-TYPE
    SYNTAXGauge
    ACCESSread-only
    STATUSmandatory
    DESCRIPTION
        "Functional Test 2

This provides information about a series of test that indicates how well a physical drive works. These test compare the way the physical drive currently operates when performing various tasks with the way it worked when it was new.

A percent value is displayed that represents how the drive works currently when compared to how the drive worked when new. New drives operate at the 100% level. By default, if the current value is less than or equal to 80 percent, a problem may exist.

If you suspect a problem, schedule server down time to run COMPAQ DIAGNOSTICS and select the Drive Monitoring Diagnostics option to verify that a problem exists."
::= (phyDrvEntry 20 )

phyDrvFunctionalTest3OBJECT-TYPE
    SYNTAXGauge
    ACCESSread-only
    STATUSmandatory DESCRIPTION
    "Functional Test 3

This provides information about a series
        of tests that indicate how well a physical
        drive works. These tests compare the way
        the physical drive currently operates when
        performing various tasks when the way it
        worked when it was new.

A percent value is displayed that
        represents how the drive works currently
        when compared to how the drive worked when
        new. New drives operate at the 100%
        level. By default, if the current value
        is less than or equal to 80 percent, a
        problem may exist.

If you suspect a problem, schedule server
        down time to run COMPAQ DIAGNOSTICS and
        select the Drive Monitoring Diagnostics
        option to verify that a problem exists."
    ::= ( phyDrvEntry 21 )

phyDrvDrqTimeoutsOBJECT-TYPE
    SYNTAXCounter
    ACCESSread-only
    STATUSmandatory
    DESCRIPTION
        "DRQ Timeouts The number of time that a physical drive
        continued to request data, but did not get
        a command completion. This value
        increases every time a DRQ timeout occurs
        for the physical drive.

A defective drive or cable may cause DRQ
        timeouts to occur. If you see an increase
        in these errors, complete the following
        steps for the monitored system:

1.
        Check the cables connecting the drive to
        ensure that they are intact.

2.
        If the cables are properly connected, schedule
        server down time to run COMPAQ DIAGNOSTICS to
        verify that a problem exists."
    ::= ( phyDrvEntry 22 )

-17- Patent Application
Docket # CMPQ-0748
P-748

```
phyDrvOtherTimeoutsOBJECT-TYPE
    SYNTAXCounter
    ACCESSread-only
    STATUSmandatory
    DESCRIPTION
        "Other Timeouts The number of times that a physical drive
        did not respond with an interrupt within
        a controller-defined period of time after
        a command had been issued.  This does not
        include DRQ timeouts.

If you suspect a problem, complete the
        following steps for the monitored system:

1.
    Check  the  cables  connecting  the  drive  to
    ensure that they are intact.

2.
    If the cables are properly connected, schedule
    server down time to run COMPAQ DIAGNOSTICS to
    verify that a problem exists."
    ::= ( phyDrvEntry 23 )

phyDrvSpinupRetriesOBJECT-TYPE
    SYNTAXCounter
    ACCESSread-only
    STATUSmandatory
    DESCRIPTION
        "Spinup Retries The number of times that a physical drive
        had   to   retry   to   spin   up   before
        successfully achieving operating speed.
        This value represents the spin-up retries
        that  occurred  since  the  last  time  you
        turned the monitored system on.

If you suspect a problem, schedule server
        down time to run COMPAQ DIAGNOSTICS and
        select the Drive Monitoring Diagnostics
        option to verify that a problem exists."
    ::= ( phyDrvEntry 24 )

phyDrvFailedRecvReadsOBJECT-TYPE
    SYNTAXCounter
    ACCESSread-only
    STATUSmandatory
    DESCRIPTION
```

"Recovery Failed Read Error

The number of times a read error occurred while performing Automatic Data Recovery from this physical drive to another drive.

If a read error occurs, Automatic Data Recovery stops. These errors indicate that the physical drive has failed. If you suspect a problem, schedule server down time to run COMPAQ DIAGNOSTICS and select the Drive Monitoring Diagnostics option to verify that a problem exits."
::= ( phyDrvEntry 25 )

phyDrvFailedRecWritesOBJECT-TYPE
    SYNTAXCounter
    ACCESSread-only
    STATUSmandatory
    DESCRIPTION
        "Recovery Failed Write Error The number of times a write error occurred while performing Automatic Data Recovery from another drive to this physical drive.

If a write error occurs, Automatic Data Recovery stops. These error indicate that the physical drive has failed. If you suspect a problem, schedule server down time to run COMPAQ DIAGNOSTICS and select the Drive Monitoring Diagnostics option to verify that a problem exists."
::= ( phyDrvEntry 26 )

phyDrvFormatErrsOBJECT-TYPE
    SYNTAXCounter
    ACCESSread-only
    STATUSmandatory
    DESCRIPTION
        "Format Errors The number of times a format operation failed when the controller attempted to remap a bad sector. Zero indicates that no format errors have occurred. The value increases each time a format error occurs. A failed format operation may cause the controller to mark a drive failed.

If you suspect a problem, schedule server

-19-    Patent Application
                                              Docket # CMPQ-0748
                                                          P-748 down time to run COMPAQ DIAGNOSTICS and
                    select the Drive Monitoring Diagnostics
                    option to verify a problem exists."
                ::= (phyDrvEntry 27 )

phyDrvPostErrorOBJECT-TYPE
            SYNTAXCounter
            ACCESSread-only
            STATUSmandatory
            DESCRIPTION
                "Power On Self Test (Post) Error The number of times that a physical drive
                failed its self test.

The physical drive does a self test each
                time the system is turned on."
                ::= ( phyDrvEntry 28 )

phyDrvNotReadyErrsOBJECT-TYPE
            SYNTAXCounter
            ACCESSread-only
            STATUSmandatory
            DESCRIPTION
                "Drive Not Ready Errors The number of times the physical drive
                failed after the spin up command was
                issued. When the spin up command was
                issued, the drive failed to reach its
                ready state. If the current value is
                zero, the drive has not failed, If the
                current value is greater than zero, at
                least one failure occurred.

This error could be caused because the
                physical drive has failed to spin.

If you suspect a problem:

1.
                Check the cables connecting the drive to
                ensure that they are intact.

2.
                If the cables are properly connected, schedule
                server down time to run COMPAQ DIAGNOSTICS to
                verify that a problem exists."
                ::= ( phyDrvEntry 29 )

phyDrvReallocAbortsOBJECT-TYPE

-20- Patent Application
Docket # CMPQ-0748
P-748

```
        SYNTAXCounter
        ACCESSread-only
        STATUSmandatory
        DESCRIPTION
            "Physical Drive Reallocation Aborts The number of times the physical drive has
            failed due to an error that occurred when
            the controller was trying to reallocate a
            bad sector.  Zero indicates that no
            Reallocation Abort errors have occurred.
            The value increases each time a
            Reallocation Abort error occurs.

Because of the nature of magnetic disks,
            certain sectors on a drive may have media
            defects.  The reallocation area is part of
            the disk drive that is set aside to
            compensate for these defects.  The array
            controller writes information addressed
            from unusable sectors to available sectors
            in the reallocation area.

If you suspect a problem, schedule server
            down time to run COMPAQ DIAGNOSTICS and
            select the Drive Monitoring Diagnostics
            option to verify a problem exists."
        ::= ( phyDrvEntry 30 )

phyDrvThreshExceededOBJECT-TYPE
        SYNTAXINTEGER
        (
            false(1),
            true(2)
        )
        ACCESSread-only
        STATUSmandatory
        DESCRIPTION
            "Physical Drive Factory Threshold Exceeded When the drive is shipped, certain
            thresholds have been set to monitor
            performance of the drives.  For example,
            a threshold might be set up for Spinup
            Time.  If the time that it takes the drive
            to spin up exceeds the factory threshold,
            there may be a problem with one of the
            drives.

If you suspect a problem, schedule server
            down time to run COMPAQ DIAGNOSTICS and
```

-21-     Patent Application
        Docket # CMPQ-0748
        P-748

```
              select the Physical Drive Test option.

Note:
              These thresholds may be under COMPAQ warranty
              under certain conditions."
              ::= ( phyDrvEntry 31 )

phyDrvHasMonitorInfoOBJECT-TYPE
              SYNTAXINTEGER
              (
                  false(1),
                  true(2)
              )
              ACCESSread-only
              STATUSmandatory
              DESCRIPTION
                  "Physical Drive Has Monitor Info All of the physical disk table fields
                  except for the physical disk status
                  (phyDrvStatus) and the bay location
                  (phyDrvBayLocation) are invalid unless
                  this field has a value of true(2).

If the value is false(1), you must run
                  COMPAQ DIAGNOSTICS and select the Physical
                  Drive Test option. This will enable the
                  physical disk monitoring information."
              ::= ( phyDrvEntry 32 )

phyDrvConditionOBJECT-TYPE
              SYNTAXINTEGER
              (
                  other(1),
                  ok(2),
                  degraded(3),
                  failed(4)
              )
              ACCESSread-only
              STATUSmandatory
              DESCRIPTION
                  "The condition of the device. This value
                  represents the overall condition of this
                  physical drive."
              ::= ( phyDrvEntry 33 )

©1992 Compaq Computer Corporation
```

It can be readily seen from the foregoing that it would be desirable to provide a method for predicting potential failures of storage devices such as ATA disk drives before such predicted failures actually occur. It is, therefore, the object of this invention to provide such a technique.

SUMMARY OF THE INVENTION

In one embodiment, the present invention is of a method for predicting an imminent failure of a storage device in which an attribute considered as indicative of an imminent failure of a storage device is selected for monitoring. The selected attribute is then monitored during operation of the storage device and, based upon changes in the monitored attribute, a prediction of an imminent failure of the storage device is issued. In one aspect, the prediction of an imminent failure of the storage device is determined by selecting a threshold value for the selected attribute and, upon determining that the monitored attribute has crossed the selected threshold value, predicting the imminent failure of the storage device.

In alternate aspects thereof, the selected attribute may be a performance attribute, an error rate attribute or an event count attribute. For the performance attribute, imminent failure is predicted upon detection of a degradation in the performance attribute such that the monitored performance attribute has a speed less than the threshold performance speed for the selected performance attribute. For the error rate attribute, imminent failure is predicted upon detection of an increase in the error rate attribute such that the monitored error rate attribute has an error rate greater than the threshold error rate. For the event count attribute, imminent failure is predicted upon detection of an increase in the event rate attribute such that the monitored event count attribute has an event count greater than the threshold event count.

In another embodiment, the present invention is of a method for predicting an imminent failure of a storage device coupled to a host computer system. In accordance with the method subject of this embodiment of the invention, at least one attribute and corresponding threshold value are selected for monitoring during operation of the storage device. An initial value is then determined for each selected attribute. The storage device is monitored to detect occurrences of each one of the selected attributes. Upon detection of an occurrence of one of the selected attributes, the initial value for that attribute is updated. If the updated value of the attribute for which the occurrence has been detected crosses the corresponding threshold value for that attribute, an imminent failure of the storage device is predicted.

In one aspect thereof, the initial value for each one of the selected attributes is determined by retrieving a saved attribute value from a drive attribute values sector of the storage device and storing the retrieved saved attribute value in a volatile memory of the host computer system as a current value. In another aspect thereof, a corresponding threshold value for each one of the selected attributes is selected by retrieving a threshold value from a warranty failure thresholds sector of the storage device and storing the retrieved threshold value in the volatile memory of the host computer system. In yet another aspect thereof, operations of the storage device are monitored to detect an occurrence of a first attribute. Upon detecting an occurrence of the first attribute, a first current value is updated in the volatile memory. The saved attribute value may then be periodically overwritten with the current value of the attribute stored in the volatile memory.

In yet another embodiment thereof, the present invention is of a method for predicting an imminent failure of an ATA disk drive. A plurality of attributes are selected for monitoring during operation of the ATA disk drive. These attributes include at least one self-preserving attribute, at least one performance attribute, at least one error rate attribute and at least one event count attribute. An initial value is determined for each one of the selected attributes. A threshold value is then selected for each of the self-preserving attributes, a threshold performance speed is selected for each of the performance attributes, a threshold error rate is selected for each of the error rate attributes and a threshold event count is selected for each of the event count attributes. If ATA disk drive failure prediction is enabled, the ATA disk drive is then monitored for occurrences of the self-preserving, performance, error rate and event count attributes. If, however, ATA disk drive failure prediction is not enabled, the ATA disk drive is monitored for occurrences of the self-preserving attributes. Each time an occurrence of the self-preserving, performance, error rate or event count attributes is monitored, the initial value for that attribute is updated. An imminent failure of the ATA disk drive is then predicted if the updated value of the attribute exceeds a corresponding threshold therefor.

In one aspect thereof, the updated value for an attribute is normalized and the normalized updated value compared with the corresponding threshold for that attribute when predicting an imminent failure of the ATA disk drive. In alternate aspects thereof, the attribute for which the occurrence was monitored may be an event count attribute such as a re-allocated sector count, a raw read error count, a spin retry count, a read channel margin, a drive calibration retry count or a drive power cycle count, a performance attribute such as spin up time, throughput performance and seek time performance, an error rate attribute such as a seek error rate or a self-preserving attribute such as a power-on hours count or a start/stop count. For event count attributes, imminent failure of the ATA disk drive is predicted if the updated value of the event count attribute exceeds the corresponding threshold event count. For performance attributes, imminent failure of the ATA disk drive is predicted if the updated value of the performance attribute exceeds the corresponding threshold performance speed. For error rate attributes, imminent failure of the ATA disk drive is predicted if the updated value of the error rate attribute for which the occurrence was monitored exceeds a corresponding threshold error rate. Finally, for self-preserving attributes, imminent failure of the ATA disk drive is predicted if the updated value of the self-preserving attribute for which the occurrence was monitored exceeds the corresponding threshold value for that attribute.

In another aspect thereof, the method for predicting imminent failure of the ATA disk drive further includes the step of performing off-line analysis of the ATA disk drive. In a further aspect thereof, monitoring of the ATA disk drive for occurrences of the self-preserving, error rate and event count attributes continue during the off-line analysis of the ATA disk drive. In yet another aspect thereof, the ATA disk drive further includes command block registers which include a cylinder low register and a cylinder high register. In this aspect, off-line analysis of the ATA disk drive may only be performed if a key code placed in the cylinder low and cylinder high registers do not match any cylinder address for the ATA disk drive.

In still yet another embodiment, the present invention is of a method for executing a command to an ATA disk drive. In accordance with this embodiment of the invention, a command is placed in a command register of the ATA interface I/O registers of the ATA disk drive. First and second key codes, neither of which match any cylinder address for the ATA disk drive, are placed in cylinder low and cylinder high registers of the ATA register. The command placed in the command register will only be executed if the first key code has been placed in the cylinder low register and the second key code has been placed in the cylinder high register. In one aspect thereof, the command placed in the command register is an execute drive failure prediction command.

BRIEF DESCRIPTION OF THE DRAWING

The present invention may be better understood, and its numerous objects, features and advantages will become apparent to those skilled in the art by reference to the accompanying drawing, in which:

FIG. 3 is a block diagram of a command block register portion of the ATA interface I/O registers of the storage device of FIG. 2;

FIG. 4 is a block diagram of a data structure for a drive attribute values sector of the storage device of FIG. 2;

DETAILED DESCRIPTION

Figure 1:
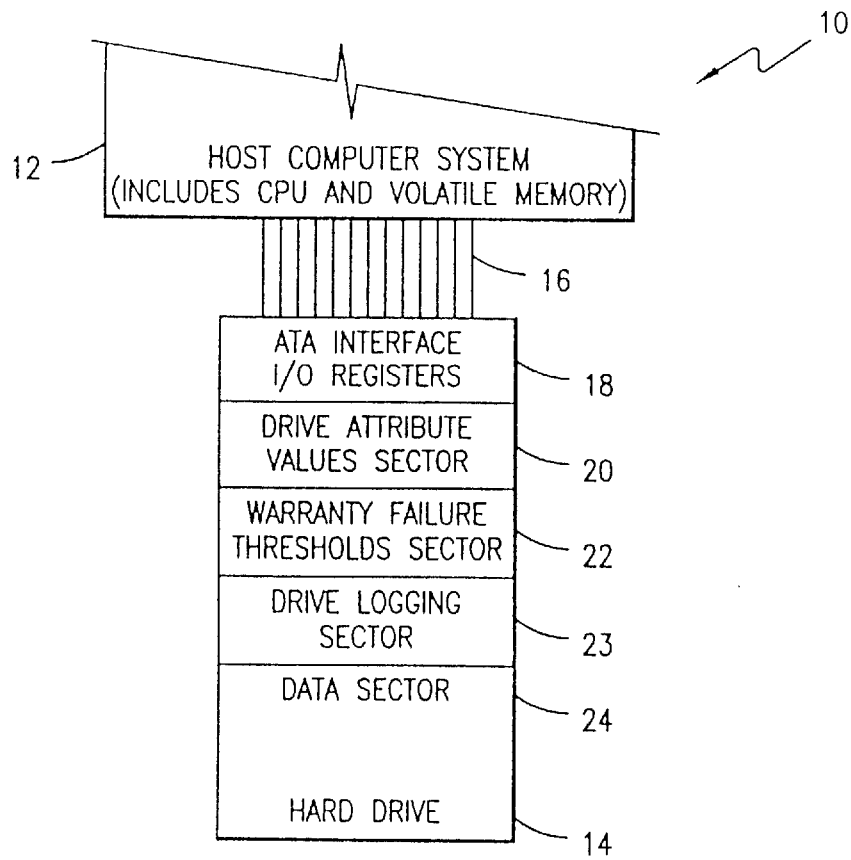
FIG. 1 is an inheritance tree illustrating a physical drive child group of a component group of a third subMIB of an enterprise MIB.
Figure 2:
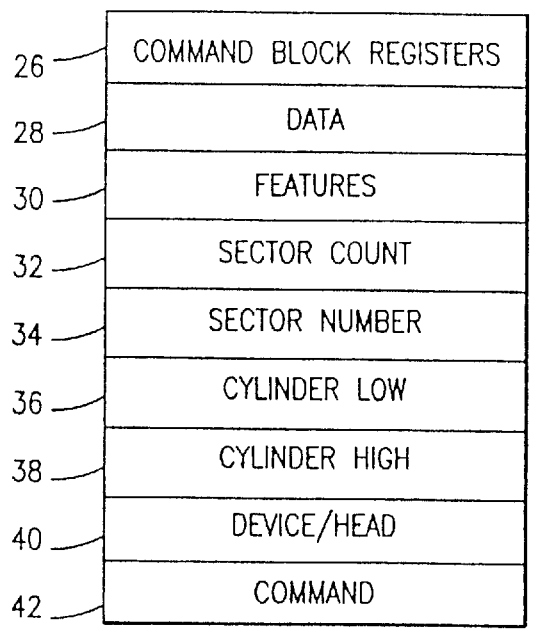
FIG. 2 is a block diagram of a host computer system constructed in accordance with the teachings of the present invention and configured for predicting drive failures for a storage device coupled thereto.

Referring now to FIG. 2, a computer system 10, for example, a personal computer (or "PC") system, configured for predicting drive failures of a storage device 14, for example, a hard drive, coupled thereto will now be described in greater detail. As is conventional in the art, the computer system 10 includes a host computer 12, which includes a central processing unit (or "CPU") and a volatile memory such as a random access memory (or "RAM"). The host computer 12 is coupled to the storage device 14 by a physical interface 16, for example a 40 pin connector. The storage device 14 is comprised of an AT attachment (or "ATA") interface input/output (or "I/O") registers 18 through which communication to or from the storage device 14 is routed, a drive attribute values sector 20 in which drive attributes considered to be key leading indicators of impending failures of the storage device 14 are periodically stored, a warranty failure thresholds sector 22 in which limits for each drive attribute value, above which the storage device 14 is deemed to have failed even though it may still be operational, are stored a drive logging sector 23 is which logging information on the storage device 14 is stored, and data sector 24 in which other information may be stored for later retrieval.

Referring next to FIG. 3, command block registers 26, which form a portion of the ATA interface I/O registers 18, will now be described in greater detail. Data register 28, which may be either 8-bits or 16-bits wide, holds data being transferred between the host computer 12 and the storage device 14 during either a read operation or a write operation. Features register 30 is command specific and may be used to enable and disable features of the ATA interface. Sector count register 32 contains the number of sectors of data to be transferred during a read operation or a write operation between the host computer 12 and the storage device 14. Sector number register 34 contains a starting sector number for a cylinder-head-sector (or "CHS") mode access of the storage device 14. Cylinder low register 36 contains the lower order bits of a starting cylinder address for a CHS mode access of the storage device 14. Cylinder high register 38 contains the high order bits of the starting cylinder address for a CHS mode access of the storage device 14. Device/head register 40 contains device addressing and sector addressing information for accesses of the storage device 14. Finally, command register 42 holds command code being transferred to the storage device 14 by the host computer 12.

The detailed mechanism by which the aforementioned command block registers 26 are utilized to perform read or write operations between the host computer 12 and the storage device 14 is well known in the art and need not be described in greater detail. However, to perform drive failure prediction management operations in accordance with the teachings of the present invention, an execute drive failure prediction command must be issued to the storage device 14. To eliminate inadvertent or unauthorized access to drive failure prediction management operations, the execute drive failure prediction command will be aborted unless a key has been loaded into the cylinder low and cylinder high registers 36 and 38. More specifically, prior to writing the execute drive failure prediction command 0xB0 to the command register 42, key codes 0x4F and 0xC2 must be respectively loaded into the cylinder low and cylinder high registers 36 and 38. As the aforementioned key codes do not correspond to any cylinder address for the storage device 14, the storage device 14 will not misinterpret the key codes as an cylinder address for the storage device 14. Upon receipt of the key codes and the execute drive failure prediction command, the storage device 14 will execute the command function contained in the features register 30.

The command functions which may be performed during drive failure prediction management operations and the function code which must be placed in the features register 30 for the function to be executed are set forth in Table I, below.

TABLE I

| CODE | COMMAND FUNCTION |
|------|------------------|
| 0xD0 | "Return Drive Attribute Values" |
| 0xD1 | "Read Warranty Failure Thresholds" |
| 0xD2 | Reserved |
| 0xD3 | "Write Current Attribute Values To Disk" |
| 0xD4 | "Perform Off-Line Data Collection" |
| 0xD5 | "Read Drive Logging Sectors" |
| 0xD6 | "Write Drive Logging Sectors" |
| 0xD7 | "Write Warranty Failure Thresholds" |
| 0xD8 | "Enable Failure Prediction Operations" |
| 0xD9 | "Disable Failure Prediction Operations" |

TABLE I-continued

| CODE | COMMAND FUNCTION |
| --- | --- |
| 0xDA | Reserved |
| ... | " |
| 0xDF | Reserved |

Upon receipt of the "Return Drive Attribute Values" command, the current drive attribute values stored in volatile memory are transferred from the host computer 12 to the storage device 14 where they are stored in the drive attributes values sector 20 as saved attribute values. Upon receipt of the "Read Warranty Failure Thresholds" commands, the values of warranty failure thresholds stored in the warranty failure thresholds sector 22 of the storage device 14 are transferred to the volatile memory of the host computer system 12. Upon receipt of the "Write Current Attribute Values To Disk" command, the current attribute values contained in the volatile memory of the host computer 12 are stored in the drive attribute values sector of the storage device 14 as saved attribute values.

Figure 8:
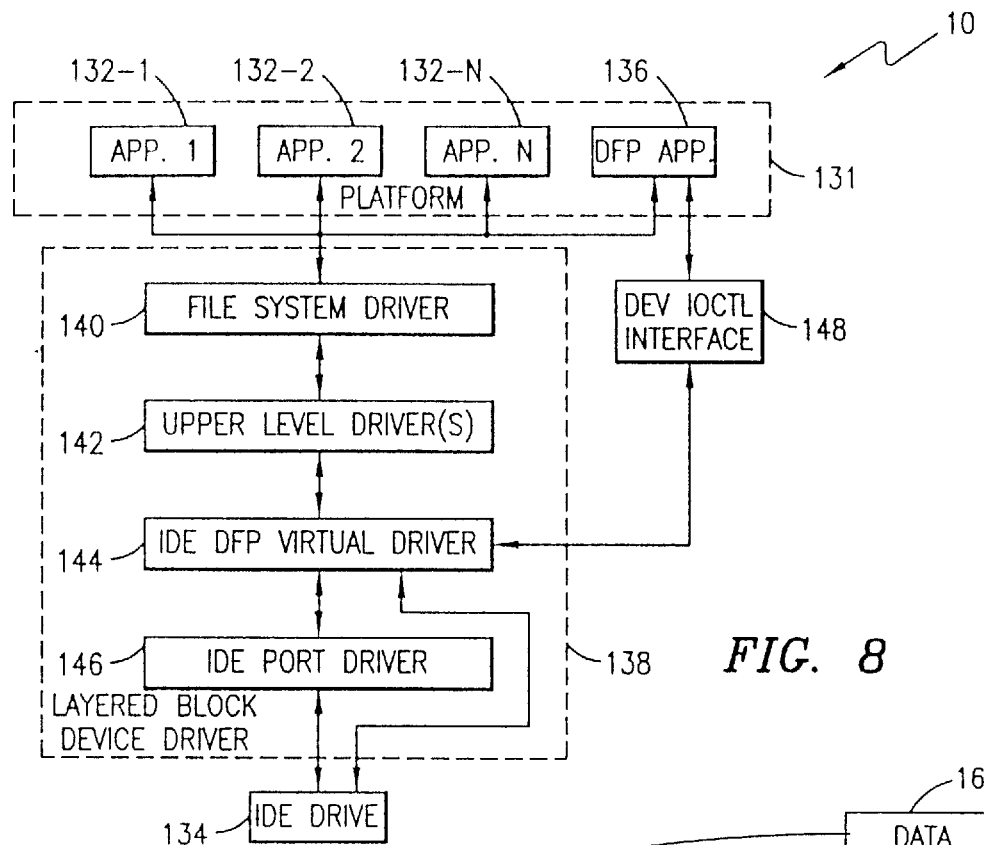
FIGS. 8–9 is a flow chart of a method for predicting an imminent failure of a storage device such as an ATA disk drive.
Figure 9:
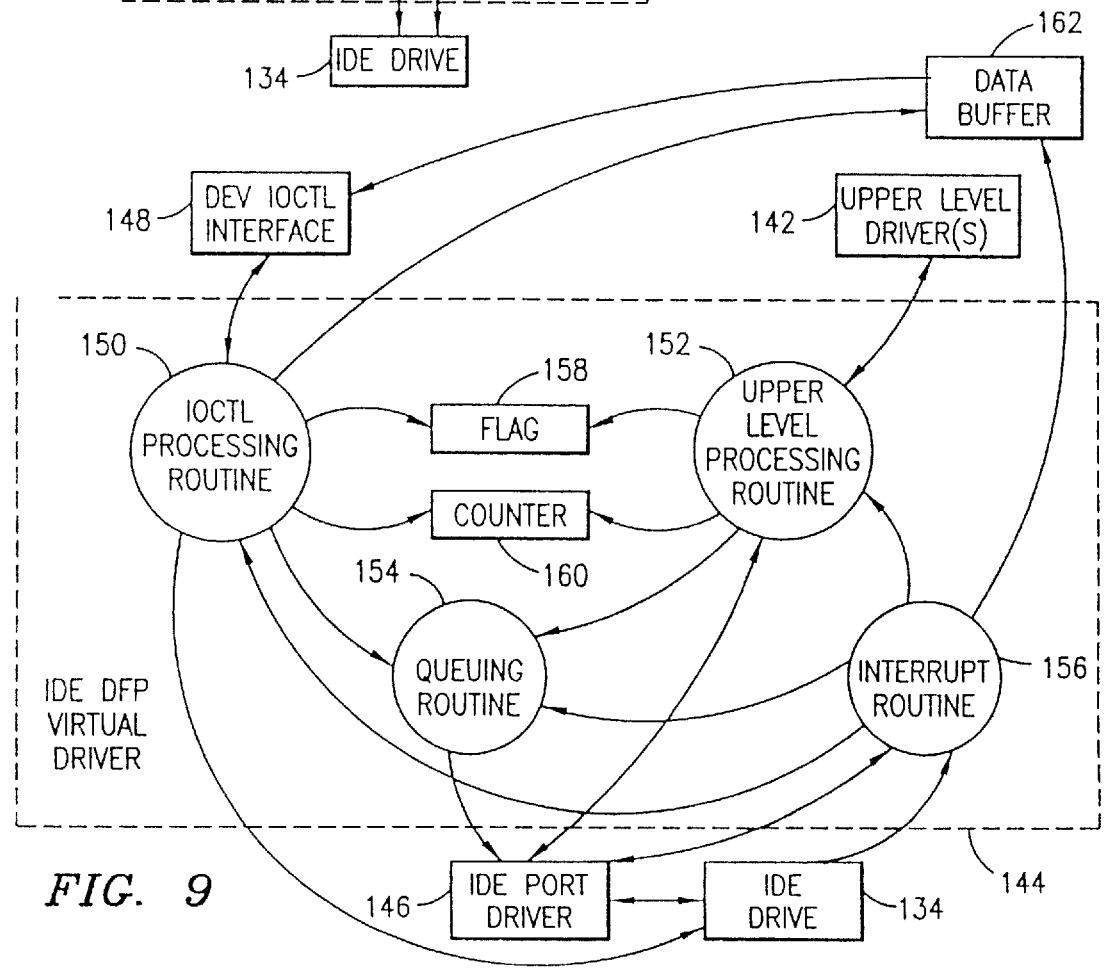

Data which is useful to drive failure prediction is either collected on-line, i.e., during normal operations of the storage device 14 or off-line, i.e. after interrupting normal operations of the storage device 14. Data which may be collected without interfering with the normal operations of the storage device 14 is collected on-line. Data collection which would interfere with the normal operations of the storage device 14 is collected off-line. On-line data collection is described in greater detail with respect to FIG. 8, below. Data which should be collected off-line includes selected performance and drive functionality tests such as sequentially scanning the entire disk for defects, measuring the read error rate, the read channel margin or the seek error rate, or performing the data throughput test. To perform any of these tests, the "Perform Off-Line Data Collection" command must first be placed in the features register 30.

In alternate embodiments of the present invention, off-line data collection initiated by the "Perform Off-Line Data Collection" may be accomplished in any one of three possible methods which primarily differ according to how many times the "Perform Off-Line Data Collection" must be issued. The first method requires the issuance of only a single "Perform Off-Line Data Collection" command. In accordance with this method of off-line data collection, off-line data collection is segmented as a single segment, off-line task to be performed as a background task. If interrupted by another command, off-line data collection is suspended until the interrupting command is completed. Off-line data collection will then resume. The second method requires the issuance of multiple "Perform Off-Line Data Collection" commands. In accordance with this method of off-line data collection, off-line data collection is segmented as a multiple segment, off-line task to be performed as a background task. If interrupted by another command, off-line data collection is suspended until the interrupting command is complete. Off-line data collection will then resume until the interrupted segment is completed. To proceed with the next segment of off-line data collection, a separate "Perform Off-Line Data Collection" command must be issued.

The third and final method for off-line collection is to segment off-line data collection as either a single or a multiple segment off-line task that is performed as a foreground task and cannot be performed as a background task. If interrupted by another command, this method may either complete the current segment and execute the interrupting command, save its off-line processing state and execute the interrupting command or abort the current off-line segment and execute the interrupting command. After completing the interrupting command, off-line data collection will not resume until another "Perform Off-Line Data Collection" command is received.

Upon receipt of the "Read Drive Logging Sectors" command, the contents of the drive logging sector 23 may be read. Stored in the drive logging sector 23 is historical information regarding the operation of the storage device 14. Logging information which may be stored in the drive logging sector 23 may include counts and statistics maintained by the storage device 14, for example, total number of sectors reads, total number of sector writes, total number of seeks, seek length histograms, request size histograms and others.

It is contemplated that an analysis of the logging information stored in the drive logging sector 23, together with the attribute values stored in the drive attribute values sector 20, can place an imminent drive failure prediction into context, i.e. identify if the prediction of a drive failure was, in fact, caused by an imminent failure of the drive. For example, if an imminent drive failure prediction was issued due to the value of the sector read error rate attribute crossing the warranty failure threshold for that attribute, a review of the logging information stored in the drive logging sector 23 may indicate that the imminent drive failure prediction was preceded by an unusually high number of sector reads. Such an occurrence would suggest that it was the heavy usage of the storage device 14, and not an erroneous operation of the storage device 14 itself, which triggered the prediction of an imminent drive failure.

Upon receipt of the "Write Drive Logging Sectors" command, the storage device 14 will prepare for the receipt of 512 bytes of data to be written to the drive logging sector 23 via the data register 28. It is contemplated that the "Write Drive Logging Sectors" command will be used as a debug tool to verify proper operation of the other execute drive failure prediction command functions.

Warranty failure threshold values may be updated using the "Write Warranty Failure Thresholds" command. Specifically, upon receipt of the "Write Warranty Failure Thresholds" command, the storage device 14 will prepare for the receipt of 512 bytes of data to be written to the warranty failure thresholds sector 22, via the data register 28, to overwrite the prior contents of the warranty failure thresholds sector 22.

Finally, drive failure prediction may be selectively enabled or disabled by respectively issuing the "Enable Failure Prediction Operations" or the "Disable Failure Prediction Operations" commands. When drive failure prediction is disabled, drive attributes are neither monitored nor updated. The state of the enable/disable failure prediction flags are preserved by the storage device 14 across power cycles, thereby preventing a power down or power up from inadvertently enabling or disabling failure prediction operations.

Referring next to FIG. 4, the data structure for the drive attribute values sector 20 in which the saved values for the drive attributes are stored may now be seen. The drive attribute values sector includes a data structure revision number 44 which identifies the version of the data structure implemented in the drive attribute values sector 20. Initially, the data structure revision number 44 will be set to 0x0001 and incremented by one for each new revision. The drive attribute values sector further includes thirty drive attributes 46-1 through 46-30, each of which will contain a saved value for a particular attribute if such attribute is supported by the storage device 14. Preferably, attributes supported by the storage device 14 should all be concatenated together directly after the data structure revision number 44. Attributes which are not supported by the storage device 14 are not included, leaving that portion of the data structure blank, i.e. set to 0x00. Finally, the drive attribute values sector 20 includes a region 48 reserved for future attributes, a region 50 reserved for attributes unique to a single vendor and a checksum 52 for detecting errors during a write to the drive attribute values sector 20.

Figure 5:
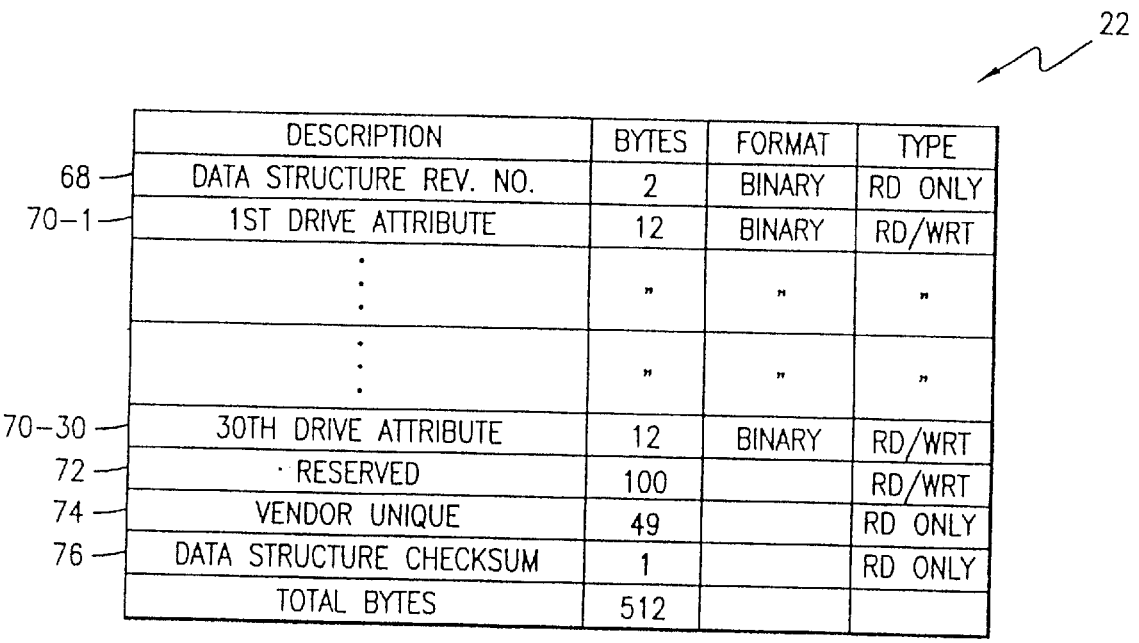
FIG. 5 is a block diagram of a data structure for a drive attribute value of the drive attribute values sector of FIG. 4.

Referring next to FIG. 5, the data structure for a drive attribute will now be described in greater detail. Attribute identification number (or "ID No.") region 54 uniquely identifies each attribute 46-1 through 46-30. Status flags region 56 includes a collection of bit flags which contain information regarding each particular attribute. Pre-failure warranty bit 56-1 identifies whether a particular failure identified by the attribute 46-N is covered under a warranty offered by the drive manufacturer. If the pre-failure warranty bit 56-1 is set to 0, a failure indicated by the value of the attribute 46-N exceeding the threshold value does not constitute a failure covered under the drive warranty. If, however, the pre-failure warranty bit 56-1 is set to 1, a failure indicated by the value of the attribute 46-N exceeding the threshold value constitutes a failure covered under the drive warranty.

On-line collection bit 56-2 indicates when the attribute 46-N is updated. If the on-line collection bit 56-2 is set to 0, the attribute 46-n is updated only during off-line testing. If, however, the on-line collection bit 56-2 is set to 1, the attribute 46-N is either updated only during on-line testing or during both on-line and off-line testing.

As previously set forth, the attribute 46-N may be either a performance, error rate or event count attribute. If the attribute 46-N is a performance attribute, performance attribute bit 56-3 is set to 1 and error rate and event count bits 56-4 and 56-5 are set to 0. Conversely, if the attribute 46-N is an error rate attribute, only the error rate bit 56-4 is set to 1 and if the attribute 46-N is an event count attribute, only the event count bit 56-5 is set to 1.

Self preserving attribute bit 56-6 indicates that the attribute 46-N is an attribute for which information is collected and saved even if drive failure prediction is disabled. Attributes are designated as self-preserving if such attributes will have more validity when always collected. For example, start/stop count is a self-preserving attribute. Finally, the remaining status flag bits 56-7 are reserved for future uses.

The data structure of the attribute 46-N maintains three values of the attribute. The raw value of the attribute is maintained in raw attribute value byte 62. The normalized value of the attribute 46-N is maintained in normalized attribute value byte 58. Finally, as both performance and error rate attributes are reversible-type attributes, i.e. may either worsen or improve over any given period of time, the worst ever normalized value of the attribute 46-N is maintained in worst ever normalized attribute value byte 60. The remaining byte 64 is reserved.

Table II, below, lists the various attributes which may be selected for collection.

TABLE II

| Number | Attribute Name |
|---|---|
| 0 | Not Used |
| 1 | Raw Read Error |
| 2 | Throughput Performance |
| 3 | Spin-Up Time |
| 4 | Start/Stop Count |
| 5 | Re-Allocated Sector Count |
| 6 | Read Channel Margin |
| 7 | Seek Error Rate |
| 8 | Seek Time Performance |
| 9 | Power-On Hours Count |
| 10 | Spin Retry Count |
| 11 | Drive Calibration Retry Count |
| 12 | Drive Power Cycle Count |
| 13–199 | Reserved Attributes |
| 200–255 | Vendor Unique Attributes |

It should be clearly understood that the list of attributes set forth in Table II is, by no means, intended to be a comprehensive listing of all possible attributes which may be selected for monitoring. For example, among the other attributes which may be selected for monitoring are sector reads, sector writes, total seeks, recovered read errors, hard write errors, recovered write errors, seek errors, data request (or "DRQ") timeouts, other timeouts, recovery failed read errors, recovery failed write errors, format errors, power on self test (or "POST") errors, drive not ready errors and physical drive reallocation aborts.

Figure 6:
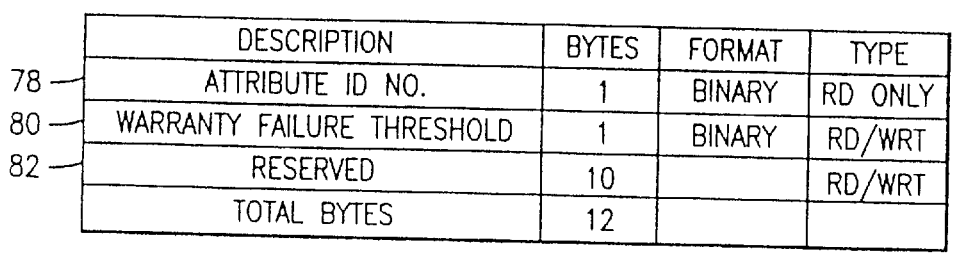
FIG. 6 is a block diagram of a data structure for the warranty failure thresholds sector of the storage device of FIG. 2.

Referring next to FIG. 6, the data structure for the warranty failure thresholds sector 22 in which the threshold values for the drive attributes stored in the drive attribute values sector 20 may now be seen. The warranty failure thresholds sector 22 includes a data structure revision number (or "rev. no.") 68 which identifies the version of the data structure implemented in the warranty failure thresholds sector 22. Initially, the data structure revision number 68 will be set to 0x0003 and incremented by one for each new revision. The warranty failure thresholds sector 22 further includes thirty drive thresholds 70-1 through 70-30, each of which will contain a saved threshold value for the corresponding attribute stored in the drive attribute sector 46-1 through 46-30. Preferably, threshold values stored in the warranty failure thresholds sector 22 should be arranged in the same order as the attribute values stored in the drive attribute values sector 20. Finally, the warranty failure thresholds sector 22 further includes a reserved region 72 for threshold values which correspond to future attributes, a region 74 reserved for threshold values corresponding to attributes unique to a single vendor and a checksum 76 for detecting errors during a write to the warranty failure threshold values sector 22.

Figure 7A:
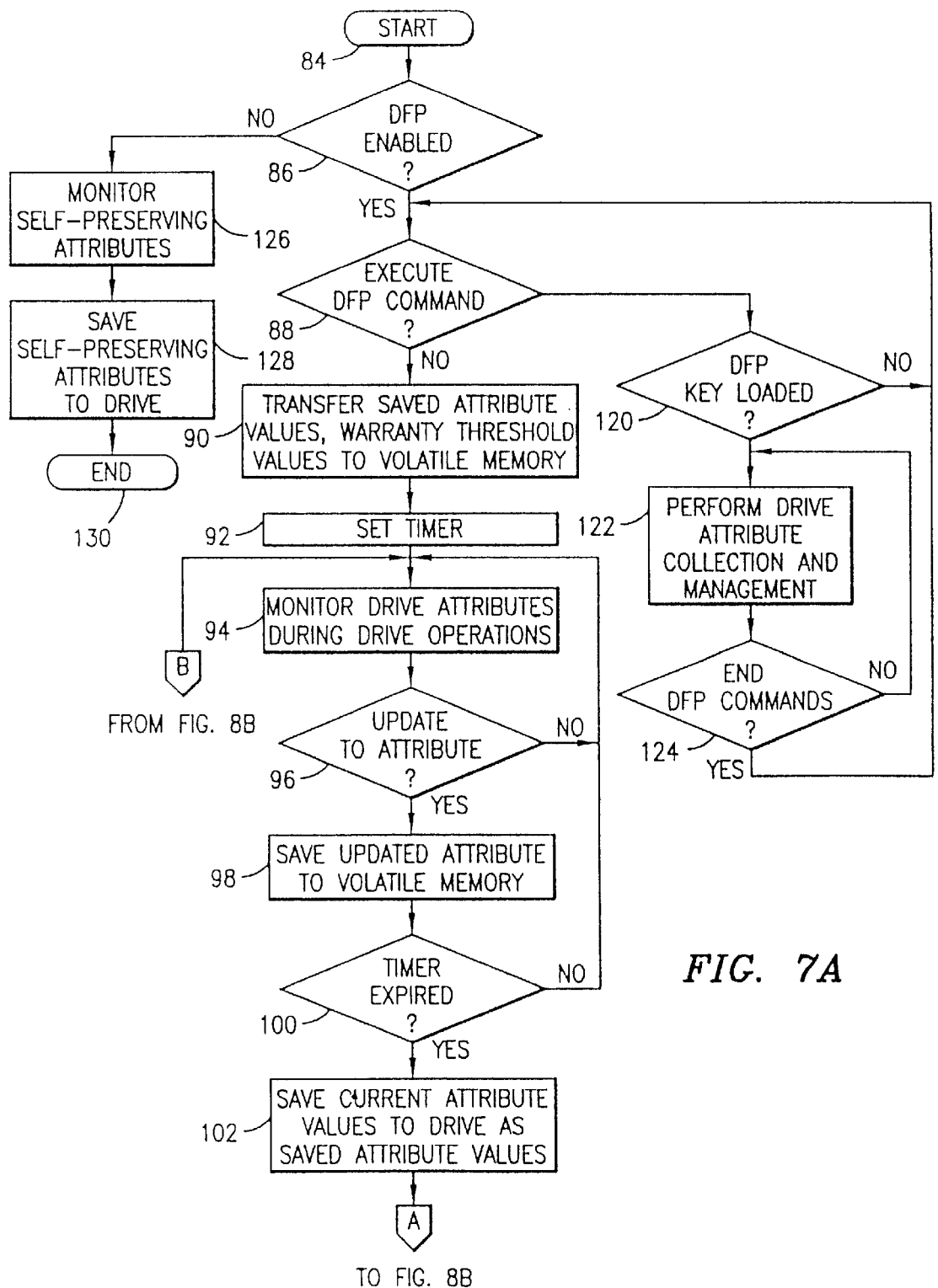
FIGS. 7A–7B is a block diagram of a data structure for a warranty failure threshold of the warranty failure thresholds sector of FIG. 6.
Figure 7B:
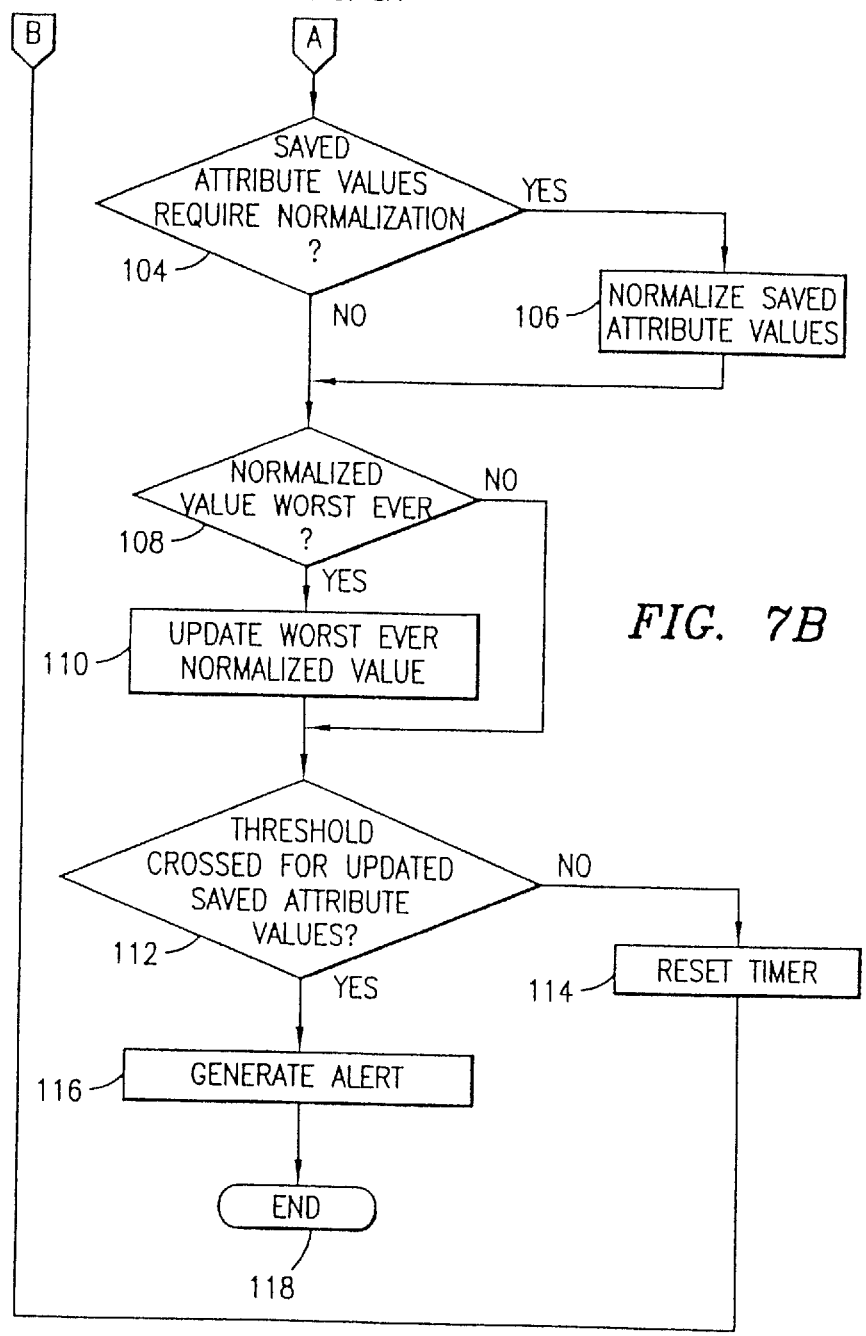

Referring next to FIG. 7, the data structure for a warranty failure threshold value will now be described in greater detail. As each warranty failure threshold value 70-N corresponds to an attribute 46-N, attribute ID No. byte 78 uniquely identifies the particular attribute 46-N to which the warranty failure threshold value 70-N corresponds. Warranty failure threshold byte 80 contains the warranty failure threshold value which is compared with the normalized attribute value contained in the normalized attribute value byte 58 to determine whether the attribute 46-N has crossed its warranty failure threshold 70-N. Finally, the warranty failure threshold value 70-N contains a region 82 which is reserved for future uses.

Referring next to FIGS. 8A–B, the method of predicting an imminent failure of an ATA disk drive or other storage device 12 subject of the present invention will now be described in greater detail. The method commences at step 84 by powering-up or resetting the computer system 10. Proceeding to step 86, the host computer 12 checks as to whether drive failure prediction has been enabled as part of the power-on-self-test (or "POST") performed during power-up. Enablement of drive failure prediction is checked by reviewing the status of the enable/disable drive failure prediction flag maintained by the storage device 14.

If it is determined at step 86 that drive failure prediction has been enabled, the method proceeds to step 88 where the host computer 12 awaits a drive failure prediction command. If no drive failure prediction command is received, the method continues on to step 90 where the saved attribute values stored in the drive attribute values sector 20 of the storage device 14 are transferred to the volatile memory of the host computer 12 where they are stored as the current attribute values for the storage device 14. Also transferred to the volatile memory of the host computer 12 at step 90 are the warranty failure threshold values stored in the warranty failure thresholds sector 22 of the storage device 14.

As previously stated, the contents of the current attribute values held in the volatile memory are periodically transferred to the storage device 14 where they are stored in the drive attribute values sector 20 as saved attribute values. Accordingly, at step 92, a timer which is set to time out upon expiration of a selected time period separating successive saves of the attribute values to the storage device 14 is set.

Proceeding to step 94, the host computer 12 monitors each of the selected attributes. More specifically, if the host computer 12 detects the occurrence of an activity within the storage device 14 which will affect one or more of the selected attributes, the host computer 12 will update the appropriate current attribute value stored in the volatile memory of the host computer 12. For example, if the occurrence of a seek error during a read operation is detected, the current value of the seek error rate attribute stored in the volatile memory of the host computer 12 must be updated. Accordingly, if the host computer 12 detects the occurrence of an event related to a drive attribute selected for monitoring, the method proceeds to step 98 where the value of the appropriate drive attribute or attributes is updated by saving the updated drive attribute to the volatile memory.

Continuing on to step 100, if the timer has not yet timed out, i.e. the time period separating successive saves of the attribute values to the storage device 14 has not elapsed, the method returns to step 94 for further monitoring of the drive attributes during drive operations. Continuous monitoring of the storage device 14 and updating of attributes for which occurrences of events are detected is maintained until the timer times out, thereby indicating that the time period between successive saves of the drive attributes to the storage device 14 has elapsed.

Upon expiration of the time period between successive saves of the drive attributes, the method proceeds to step 102 where the current attribute values stored in the volatile memory of the host computer 12 are stored to the drive attribute values sector 20 of the storage device 14 as saved attribute values. Proceeding to step 104, a determination is made as to any of the saved attribute values require normalization. More specifically, normalization may be required if the raw attribute value bytes 62 were changed during the save of the current attribute values to the storage device 14 as saved attribute values.

If the raw attribute value bytes 62 were changed, the method proceeds to step 106 where the normalized attribute value byte 58 is revised if necessary. Normalization is a process by which the raw value of an attribute is given a relative weight for comparison with a threshold value. By normalizing the raw value of an attribute, the method avoids an instantaneous raw value from being improperly interpreted as an imminent failure. For example, if one read error occurs during the first ten read operations, the read error rate will exceed the read error rate threshold and a prediction of an imminent failure of the storage device 14 will be issued even though the storage device 14 could then subsequently execute 1 million additional read operations without error.

Generally, the normalization process must address three phenomena which occur during the data collection process and which may cause inaccuracies in the disclosed method of predicting imminent drive failures. These phenomena are data swamping, data spiking and statistical invalidity. Data swamping occurs when past data overshadows recent data, thereby masking an imminent failure. This problem may be solved by collecting data over a discrete range of samples. Data spikes occur when an attribute has a single departure from its normal operating range. Such spikes may cause a failure prediction even though no such failure is imminent. To avoid data spikes from causing errant failure predictions, several raw data points should be collected before normalizing the raw value of the attribute. Finally, statistical invalidity is a concern with respect to certain attributes, for example, the read error rate discussed above, which require that multiple samples be collected before an accurate calculation can be made.

It should be appreciated by one skilled in the art that characteristics of a given attribute may cause the normalization and statistical validity algorithm to differ from the normalization and statistical validity algorithm for others of the attributes. For example, for the spin-up retry attribute, the total number of spin-up retries which have occurred is stored in the raw attribute value byte 62. If 30 spin-up retries is selected as the warranty threshold value, then the equation set forth below may be used to calculate a normalized value for the spin-up retry count:

$$\text{spin-up retry count} = \frac{(\text{max spin retries} - \text{spin retry count})}{\text{max spin retries}} \times 100$$

where the max spin-up retries equals 30 and the spin-up retry count is accumulated by the drive over 200 spin-ups. Thus, if fifteen spin-up retries occuring per 200 spin-ups is considered to be indicative of a drive that is ready to fail, then the threshold for this attribute would be set to 50.

By normalizing the threshold values, potential misinterpretations of attribute raw counts as indicators of potential failures are avoided. It is specifically contemplated that the end points for all of the normalized attributes will be 1 and 100, although, for performance and error rate type attributes, values greater than 100 are possible.

After normalization of any saved updated attribute values requiring normalization is completed at step 106 or if it was determined at step 104 that none of the saved attribute values required normalization, the method proceeds to step 108 where a determination is made as to whether the normalized value of the attribute is the worst ever normalized value of that attribute by comparing the contents of the normalized attribute value byte 58 and the worst ever normalized attribute value byte 60. If the value of the normalized attribute value byte 58 is greater than the worst ever normalized attribute value byte 60, the worst ever normalized attribute value byte is updated at step 108 by writing the contents of normalized attribute value byte 58 to the worst ever normalized attribute value byte 60.

Proceeding on to step 112, the contents of the normalized attribute value byte 58 is compared to the contents of the warranty failure threshold byte 80 to determine whether the normalized attribute value has crossed the threshold value for that attribute. If it is determined at step 112 that the threshold has been crossed, the method proceeds to step 114 where an alert is generated, for example, by displaying a pop-up window on the display screen of the host computer 12 which contains a message alerting the operator to the imminent failure of the storage device 14. The operator may then use this information to take appropriate corrective action to minimize both data loss and down time. Having issued an alert as to the imminent failure of the storage device 14, the method of the present invention ends at step 118, for example, by the operator powering down the host computer 12 so that repairs may be initiated. It should be understood, however, that if the operator ignores the alert and continues to operate the host computer 12, the method would proceed to step 114 where the timer is reset and then return to step 94 where monitoring of the selected attributes would continue in the manner previously described as if no alert were generated. Alternately, if the operator responds to the alert by disabling drive failure prediction, the method would proceed to step 126, below.

Returning to step 112, if it is determined that the normalized attribute value has not crossed the threshold value for that attribute, the method proceeds to step 114 where the timer is reset and returns to step 94 where monitoring of the selected attributes would continue in the manner previously described.

Returning now to step 88, if the operator wishes to execute one of the drive failure prediction commands set forth in Table I, above, the operator places the desired drive failure prediction command in the command register 42 and the key into the cylinder low and cylinder high registers 36 and 38. Proceeding to step 120, the storage device 42 examines the cylinder low and cylinder high registers 36 and 38 to determine if the key has been placed therein. If the key has been placed in the cylinder low and cylinder high registers 36 and 38, the method proceeds to step 122 where a selected one of the drive failure prediction commands set forth in Table I may be executed. If, however, the key has not been placed in the cylinder low and cylinder high registers 36 and 38, the method returns to step 88.

Proceeding to step 124, if the executed drive failure prediction command is the last command to be performed, the method returns to step 88. If, however, another drive failure prediction command is to be executed, the method returns to step 122 to perform the next requested drive failure prediction command.

Returning now to step 86, if it is determined that drive failure prediction is not enabled, the method proceeds to step 126 where self-preserving attributes are monitored in the same manner previously described with respect to all other attributes even though drive failure prediction is not enabled. The method of monitoring self-preserving attributes while drive failure prediction is disabled differs from that previously described with respect to the monitoring of all attributes when drive failure prediction is enabled only in that no alerts are generated in response to a self-preserving attribute crossing a warranty failure threshold. Proceeding to step 128, monitoring of the self-preserving attributes ends, for example, by powering down the computer or by enabling drive failure prediction, in which case the method would then proceed to step 88.

Thus, there has been described and illustrated herein, a method for predicting an imminent failure of an ATA disk drive or other storage device. By providing advance warning of a drive failure, the user may schedule the computer for drive replacement, thereby avoiding the unplanned interruptions and potential data loss caused by a drive failure. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A method of predicting an imminent failure of a storage device within a computer system, comprising:

selecting an attribute as indicative of an imminent failure of a storage device, said selected attribute being a performance attribute;

monitoring said selected performance attribute during normal operation of said storage device;

selecting threshold performance speed for said selected performance attribute;

automatically predicting an imminent failure of said storage device based upon determining that said selected performance attribute has a speed less than said threshold performance speed; and alerting an operator of the computer system of the imminent failure of said storage device.

2. A method of predicting an imminent failure of a storage device within a computer system, comprising:

selecting an attribute as indicative of an imminent failure of a storage device;

monitoring said selected attribute during normal operation of said storage device;

automatically predicting an imminent failure of said storage device based upon changes in said monitored attribute; and alerting an operator of the computer system of the imminent failure of said storage device, wherein said selected attribute is an error rate attribute and wherein said predicting an imminent failure of said storage device based upon changes in said selected attribute operates to predict an imminent failure of said storage device upon detecting an increase in said error rate attribute.

3. A method of predicting an imminent failure of a storage device according to claim 2 and further comprising:

selecting a threshold error rate for said selected error rate attribute; and predicting an imminent failure of said storage device upon determining that said monitored error rate attribute has an error rate greater than said threshold error rate.

4. A method of predicting an imminent failure of a storage device within a computer system, comprising:

selecting an attribute as indicative of an imminent failure of a storage device;

monitoring said selected attribute during normal operation of said storage device;

normalizing said monitored attribute;

automatically predicting an imminent failure of said storage device based upon changes in said normalized monitored attribute; and alerting an operator of the computer system of the imminent failure of said storage device, wherein said selected attribute is an event count attribute and wherein said predicting an imminent failure of said storage device based upon changes in said normalized monitored attribute operates to predict an imminent failure of said storage device upon detecting an increase in said event count attribute.

5. A method of predicting an imminent failure of a storage device according to claim 4 and further comprising:

selecting a threshold event count for said selected event count attribute; and predicting an imminent failure of said storage device upon determining that said normalized monitored event count attribute has an event count greater than said threshold event count.

6. For a computer system having a host computer and a storage device coupled to said host computer, a method of predicting an imminent failure of said storage device, comprising:

selecting at least one attribute for monitoring during operation of said storage device;

selecting a corresponding threshold value for each one of said at least one attribute, said selecting of the corresponding threshold value includes at least,
retrieving, from said storage device, a threshold value for each one of said at least one attribute, and
storing, in said volatile memory of said host computer, said retrieved threshold value for each one of said at least one attribute;

obtaining a previously stored initial value for each one of said at least one attribute;

monitoring said storage device to detect occurrences of said at least one attribute;

upon detection of an occurrence of one of said at least one attribute, updating said initial value for said attribute for which said occurrence has been detected; and automatically predicting an imminent failure of said storage device if said updated value of said attribute for which said occurrence has been detected crosses said corresponding threshold value for said attribute.

7. A method of predicting an imminent failure of a storage device according to claim 6, wherein said host computer further comprises a volatile memory and said storage device comprises a drive attribute values sector, and wherein said obtaining of said previously stored initial value for each one of said at least one attribute comprises:
retrieving, from said drive attribute values sector of said storage device, a saved attribute value for each one of said at least one attribute; and
storing, in said volatile memory of said host computer, said retrieved saved attribute value for each one of said at least one attribute as a current value for each one of said at least one attribute.

8. A method of predicting an imminent failure of a storage device according to claim 7 wherein said storage device further comprises a warranty failure thresholds sectors, and wherein said retrieving of said threshold value for each one of said at least one attribute operates to retrieve said threshold values from said warranty failure thresholds sector of said storage device.

9. A method of predicting an imminent failure of a storage device according to claim 7 and further comprising:

monitoring operations of said storage device to detect an occurrence of a first one of said at least one attribute; and upon detecting said occurrence of said first one of said at least one attribute, updating, in said volatile memory, a first current value which corresponds to said first one of said at least one attribute.

10. A method of predicting an imminent failure of a storage device according to claim 9 and further comprising:

periodically overwriting said saved attribute value for each one of said at least one attribute stored in said drive attribute values sector of said storage device with said current value of each one of said at least one attribute stored in said volatile memory.

11. A method of predicting an imminent failure of a storage drive within a computer system, comprising:

selecting an attribute as indicative of an imminent failure of a storage device;

monitoring said selected attribute during normal operation of said storage device;

automatically predicting an imminent failure of said storage device based upon changes in said selected attribute, said predicting including at least,
selecting a threshold value for the selected attribute, and
predicting an imminent failure of said storage device upon determining that said selected attribute crosses said selected threshold value, said predicting including at least (i) normalizing said selected attribute for which said occurrence was monitored, and (ii) comparing said normalized selected attribute with the threshold value corresponding thereto; and alerting an operator of the computer system of the imminent failure of said storage device.

12. A method of predicting an imminent failure of a storage drive within a computer system, comprising:

selecting an attribute as indicative of an imminent failure of a storage device;

monitoring said selected attribute during normal operation of said storage device;

automatically predicting an imminent failure of said storage device based upon changes in said selected attribute, said predicting including at least,
selecting a threshold value for the selected attribute, the selected threshold value being a warranty failure threshold, and
predicting an imminent failure of said storage device upon determining that said selected attribute crosses said selected threshold value; and alerting an operator of the computer system of the imminent failure of said storage device.

13. For a computer system having a host computer and a storage device coupled to said host computer, a method of predicting an imminent failure of a storage device, comprising:

selecting at least one attribute for monitoring during operation of said storage device;

selecting a corresponding threshold value for each one of said at least one attribute;

obtaining a previously stored initial value for each one of said at least one attribute;

monitoring said storage device to detect occurrences of said at least one attribute;

upon detection of an occurrence of one of said at least one attribute, updating said initial value for said attribute for which said occurrence has been detected; and automatically predicting an imminent failure of said storage device if said updated value of said attribute for which said occurrence has been detected crosses said corresponding threshold value for said attribute, said predicting including at least,
normalizing said updated value for said attribute for which said occurrence was monitored, and
comparing said normalized updated value with said corresponding threshold for said attribute.

14. A method of predicting an imminent failure of a storage device according to claim 13, wherein said method further comprises:
alerting an operator of the computer system of the imminent failure of said storage device.

15. For a computer system having a host computer and a storage device coupled to said host computer, a method of predicting an imminent failure of a storage drive, comprising:
selecting at least one attribute for monitoring during operation of said storage device;
selecting a corresponding threshold value for each one of said at least one attribute, said corresponding threshold value being a warranty failure threshold;
obtaining a previously stored initial value for each one of said at least one attribute;
monitoring said storage device to detect occurrences of said at least one attribute;
upon detection of an occurrence of one of said at least one attribute, updating said initial value for said attribute for which said occurrence has been detected; and
automatically predicting an imminent failure of said storage device if said updated value of said attribute for which said occurrence has been detected crosses said corresponding threshold value for said attribute.

16. A method of predicting an imminent failure of a storage device according to claim 15, wherein said method further comprises:
alerting an operator of the computer system of the imminent failure of said storage device.

17. A method of predicting an imminent failure of a disk drive, comprising the steps of:
selecting a plurality of attributes for monitoring during operation of said disk drive, said plurality of attributes including at least one self-preserving attribute, at least one performance attribute, at least one error rate attribute and at least one event count attribute;
determining an initial value for each one of said at least one self-preserving attribute, at least one performance attribute, at least one error rate attribute and at least one event count attribute;
selecting a threshold value for each of said at least one self-preserving attribute, a threshold performance speed for each of said at least one performance attribute, a threshold error rate for each of said at least one error rate attribute and a threshold event count for each of said at least one event count attribute;
if disk drive failure prediction is enabled, monitoring said disk drive for occurrences of said at least one self-preserving attribute, at least one performance attribute, at least one error rate attribute and at least one event count attribute;
if disk drive failure prediction is not enabled, monitoring said disk drive for occurrences of said at least one self-preserving attribute;
each time an occurrence of said at least one self-preserving attribute, said at least one performance attribute, said at least one error rate attribute or said at least one event count attribute is monitored, updating said initial value for said attribute for which said occurrence was monitored; and
predicting an imminent failure of said disk drive if said updated value of said attribute for which said occurrence was monitored exceeds a corresponding threshold for said attribute.

18. A method of predicting an imminent failure of a disk drive according to claim 17 wherein the step of predicting an imminent failure of said disk drive if said updated value of said attribute for which said occurrence was monitored exceeds a corresponding threshold for said attribute further comprises the steps of:
normalizing said updated value for said attribute for which said occurrence was monitored; and
comparing said normalized updated value with said corresponding threshold for said attribute.

19. A method of predicting an imminent failure of a disk drive according to claim 17 wherein said attribute for which said occurrence was monitored was one of said at least one event count attribute and wherein the step of predicting an imminent failure of said disk drive if said updated value of said attribute for which said occurrence was monitored exceeds a corresponding threshold for said attribute further comprises the steps of:
comparing said updated value of said event count attribute for which said occurrence was monitored to said corresponding threshold event count; and
predicting an imminent failure of said disk drive if said updated value of said event count attribute for which said occurrence was monitored exceeds said corresponding threshold event count.

20. A method of predicting an imminent failure of a disk drive according to claim 19 wherein said at least one event count attribute includes a re-allocated sector count attribute, a raw read error count attribute, spin retry count attribute, a read channel margin attribute, a drive calibration retry count and a drive power cycle count attribute.

21. A method of predicting an imminent failure of a disk drive according to claim 17 wherein said attribute for which said occurrence was monitored was one of said at least one performance attribute and wherein the step of predicting an imminent failure of said disk drive if said updated value of said attribute for which said occurrence was monitored exceeds a corresponding threshold for said attribute further comprises the steps of:
comparing said updated value of said performance attribute for which said occurrence was monitored to said corresponding threshold performance speed; and
predicting an imminent failure of said disk drive if said updated value of said performance attribute for which said occurrence was monitored exceeds said corresponding threshold performance speed.

22. A method of predicting an imminent failure of a disk drive according to claim 21 wherein said at least one performance attribute includes a spin up time attribute, a throughput performance attribute and a seek time performance attribute.

23. A method of predicting an imminent failure of a disk drive according to claim 17 wherein said attribute for which said occurrence was monitored was one of said at least one error rate attribute and wherein the step of predicting an imminent failure of said disk drive if said updated value of said attribute for which said occurrence was monitored exceeds a corresponding threshold for said attribute further comprises the steps of:
comparing said updated value of said error rate attribute for which said occurrence was monitored to said corresponding threshold error rate; and predicting an imminent failure of said disk drive if said updated value of said error rate attribute for which said occurrence was monitored exceeds said corresponding threshold error rate.

24. A method of predicting an imminent failure of a disk drive according to claim 23 wherein said at least one error rate attribute includes a seek error rate attribute.

25. A method of predicting an imminent failure of a disk drive according to claim 17 wherein said attribute for which said occurrence was monitored was one of said at least one self-preserving attribute and wherein the step of predicting an imminent failure of said disk drive if said updated value of said attribute for which said occurrence was monitored exceeds a corresponding threshold for said attribute further comprises the steps of:

comparing said updated value of said self-preserving attribute for which said occurrence was monitored to said corresponding threshold value; and predicting an imminent failure of said disk drive if said updated value of said self-preserving attribute for which said occurrence was monitored exceeds said corresponding threshold value.

26. A method of predicting an imminent failure of a disk drive according to claim 25 wherein said at least one self-preserving attribute includes a power-on hours count attribute and a start/stop count attribute.

27. A method of predicting an imminent failure of a disk drive according to claim 17 and further comprising the step of performing off-line analysis of said disk drive.

28. A method of predicting an imminent failure of a storage device according to claim 27 wherein said monitoring of said disk drive for occurrences of said at least one self-preserving attribute, at least one error rate attribute and at least one event count attribute continues during said off-line analysis of said disk drive.

29. A method of predicting an imminent failure of a disk drive according to claim 28 wherein said disk drive further comprises command block registers which include a cylinder low register and a cylinder high register and wherein the step of performing off-line analysis of said disk drive further comprises the steps of:

placing a key code in said cylinder low register and said cylinder high register; and performing off-line analysis of said disk drive only if said key code has been placed in said cylinder low and said cylinder high register;

wherein said key code placed in said cylinder low and cylinder high registers do not match any cylinder address for said disk drive.

30. A method of predicting an imminent failure of a storage device according to claim 17 wherein said disk drive is an ATA disk drive.

31. A method of executing a command for a disk drive having interface I/O registers which include a command register, a cylinder low register and a cylinder high register, comprising the steps of:

placing a command in said command register; placing a first key code in said cylinder low register and a second key code in said cylinder high register; and executing said command only if said first key code has been placed in said cylinder low register and said second key code has been placed in said cylinder high register;

wherein said first key code placed in said cylinder low and said second key code placed in said cylinder high registers do not match any cylinder address for said disk drive.

32. A method of executing a command for a disk drive according to claim 31 wherein said command is an execute drive failure prediction command.

33. A method of predicting an imminent failure of a storage device according to claim 31 wherein said disk drive is an ATA disk drive and said interface I/O registers are ATA interface I/O registers.

* * * * *